United States Patent [19]
Goodwin

[11] Patent Number: 6,099,163
[45] Date of Patent: Aug. 8, 2000

[54] CORRECTION CIRCUIT FOR LINEARIZING OUTPUT OF TEMPERATURE SENSOR AND METHOD OF CONSTRUCTION

[75] Inventor: Shaun Goodwin, Hurlock, Md.

[73] Assignee: Airpax Corporation, LLC, Frederick, Md.

[21] Appl. No.: 09/116,799

[22] Filed: Jul. 16, 1998

Related U.S. Application Data

[60] Provisional application No. 60/078,644, Mar. 19, 1998.

[51] Int. Cl.⁷ ...................................... G01K 7/00
[52] U.S. Cl. .......................... 374/172; 374/183; 327/512
[58] Field of Search .................... 374/172, 183; 327/512, 513

[56] References Cited

U.S. PATENT DOCUMENTS

| | | | |
|---|---|---|---|
| 2,971,379 | 2/1961 | Weisheit | 374/183 |
| 3,052,124 | 9/1962 | Averitt | 374/172 |
| 3,472,073 | 10/1969 | Irani | 374/172 |
| 3,882,725 | 5/1975 | Rao et al. | 374/168 |
| 3,933,046 | 1/1976 | Ebrecht | 374/183 |
| 3,973,147 | 8/1976 | Yu | 327/512 |
| 4,000,454 | 12/1976 | Brakl | 374/172 |
| 4,215,336 | 7/1980 | Smith | 327/512 |

OTHER PUBLICATIONS

"Linear Device Data Book" (1994 National Semiconductor Corporation), pp. 1–11 of the section entitled "LM135/LM235/LM334, LM135A/LM235A/LM335A Precision Temperature Sensors". May 1992.

Primary Examiner—Diego Gutierrez
Assistant Examiner—Lydia De Jesus
Attorney, Agent, or Firm—Milde, Hoffberg & Macklin, LLP

[57] ABSTRACT

A circuit for correcting a non-linear output of an electronic temperature sensor due to a non-linear drift over an operating range of temperature. The circuit includes a first circuit portion for adjusting a bias voltage of the sensor to a select initial voltage. The circuit also includes second circuit portion interfacing with the first circuit portion. The second circuit portion comprises at least one electronic element with a non-linear drift over the operating range of temperature, but in a direction opposite that of the drift of the temperature sensor. Thus, the drift of the electronic element alters the bias voltage over the operating range in a manner that compensates (at least partially) for the non-linear drift of the temperature sensor.

13 Claims, 3 Drawing Sheets

CORRECTION CIRCUIT FOR LINEARIZING OUTPUT OF TEMPERATURE SENSOR AND METHOD OF CONSTRUCTION

Priority is claimed under 35 U.S.C. §119(e)(1) to provisional application Ser. No. 60/078,644, filed Mar. 19, 1998.

BACKGROUND AND SUMMARY OF THE INVENTION

This invention generally pertains to the field of electronic temperature sensors ("sensors") and configuring such sensors in circuits that compensate for non-linearity of the output of the sensors as a function of temperature.

Sensors of the type described above are typified by the part designated LM335 by the National Semiconductor Corporation and are commercially available. The LM335 is described in National's "Linear Device Data Book" (1994 National Semiconductor Corporation) at pages 1–11 of the section entitled "LM135/LM235/LM335, LM135A/LM235A/LM335A Precision Temperature Sensors" and dated May 1992, which is incorporated by reference herein. (These pages of National's Linear Device Data Book will be referred to as "National's Data Book" below).

(Because of National's part designations, there is actually no part number designated the "LM335". The part available from National having the characteristics of the LM335 in National's Data Book has a part number with "Z" suffix: LM335Z. This suffix simply designates that the part comes in a plastic package. Thus, when referring to the LM335 below, the actual part meant to be referred to from National is the LM335Z.)

The voltage output of typical temperature sensors such as the LM335 are non-linear. The LM335 and like temperature sensors are typically incorporated into circuits that provide for the setting a bias voltage output, but do not compensate for the non-linearity of the sensor.

Thus, a disadvantage of the prior art circuitry was that it did not correct for the non-linearity of the temperature sensor.

The present invention overcomes the deficiencies of the prior art by providing electronic circuitry that corrects the non-linearity of the temperature sensor, such as the non-linearity created by the temperature related drift of the output of the temperature sensor.

According to the invention, the non-linear temperature sensor is configured together with electronic circuitry. A first portion of the electronic circuitry interfaces with the sensor and adjusts the output of the sensor. The first portion of the electronic circuitry, for example, may interface to apply a voltage at a bias of the sensor, thereby adding a constant voltage to the output of the sensor.

Also according to the invention, a second portion of the electronic circuitry is provided. The second portion of the electronic circuitry adjusts the parameters of the first portion of the electronic circuitry over the operating range of the sensor. By adjusting the first portion of the electronic circuitry, the output of the sensor is adjusted.

The second portion of the electronic circuitry is configured so that the adjustment to the output of the sensor caused by the first portion of the electronic circuitry substantially counteracts the non-linear drift of the sensor over the operating range of the sensor.

Where the first portion interfaces with a bias point of the sensor, the second portion may, for example, alter the first portion in a manner that the voltage supplied to the bias point adjusts the voltage output of the sensor to be approximately linear over its operating range.

In a particular embodiment of the invention, the sensor has a bias point that is adjusted by a first portion of electronic circuitry comprising a series connection of a resistor, a potentiometer and a second resistor. The bias point of the sensor is connected to the contact point of the potentiometer. The second portion of the electronic circuitry comprises a thermistor having a temperature coefficient opposite that of the sensor. The thermistor is connected in parallel with one of the resistors of the first portion. The effective resistance of the resistor of the first portion is thus altered by the thermistor of the second portion. By changing the effective resistance, the voltage at the contact point of the potentiometer and thus the bias point of the sensor is changed in a direction opposite that of the drift of the sensor. Selection of the values of the electronic components of the first and second portion can create a change in bias voltage that substantially counteracts the voltage drift of the sensor over the operating range of the sensor, thereby making the sensor output substantially linear.

BRIEF DESCRIPTION OF THE DRAWINGS

For better understanding of the invention, reference is made to the following drawings which are to be taken in conjunction with the detailed description to follow.

DETAILED DESCRIPTION OF THE PREFERRED EMBODIMENT

Figure 1:
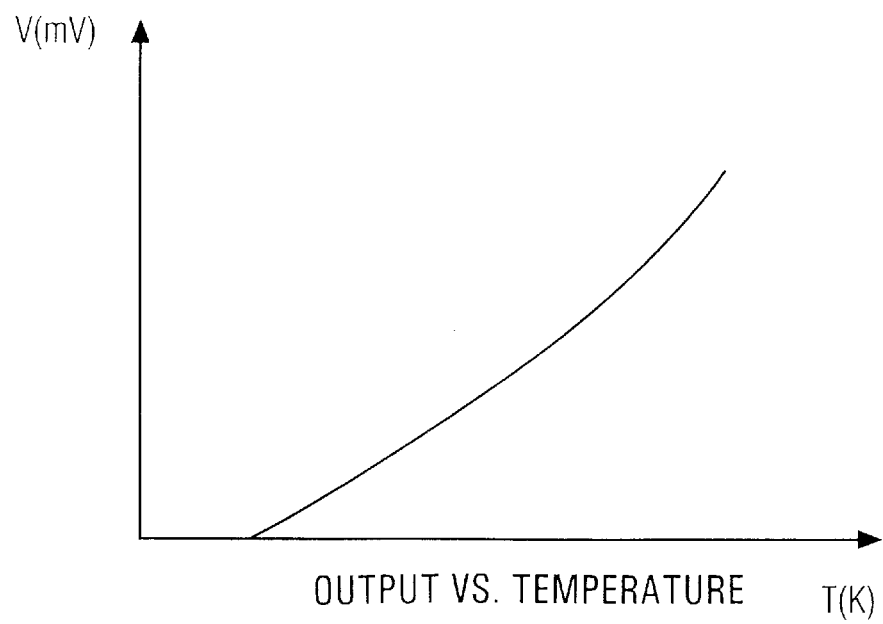
FIG. 1 is a graphic depiction of voltage output versus temperature for a typical temperature sensor.

Referring to FIG. 1, a graph generically representing the voltage output versus temperature for a typical temperature sensor is shown. The description below will focus on the National LM335Z temperature sensor described above which has a voltage versus temperature profile analogous to that shown in FIG. 1. (Although the description will focus on the LM335, the principles of the description to follow will hold for any sensor having non-linear characteristics). As seen in FIG. 1, the output of the sensor is non-linear, although, for a small temperature range around a nominal operating temperature, the output of the sensor is approximately linear.

For the LM335, the voltage output versus temperature curve is approximately the same shape as shown in FIG. 1, and its non-linearity is approximately 30 mV over an operating range of approximately 140° C. (The operating range of the LM335 is between approximately −40° C. and 100° C.) The non-linearity of the device is approximately uniform over the operating region and has a positive temperature coefficient. Thus, the voltage output versus temperature curve of the sensor diverges upward from a line defined by the beginning of the operating range by an amount proportional to the distance from the beginning of the operating range.

Figure 2:
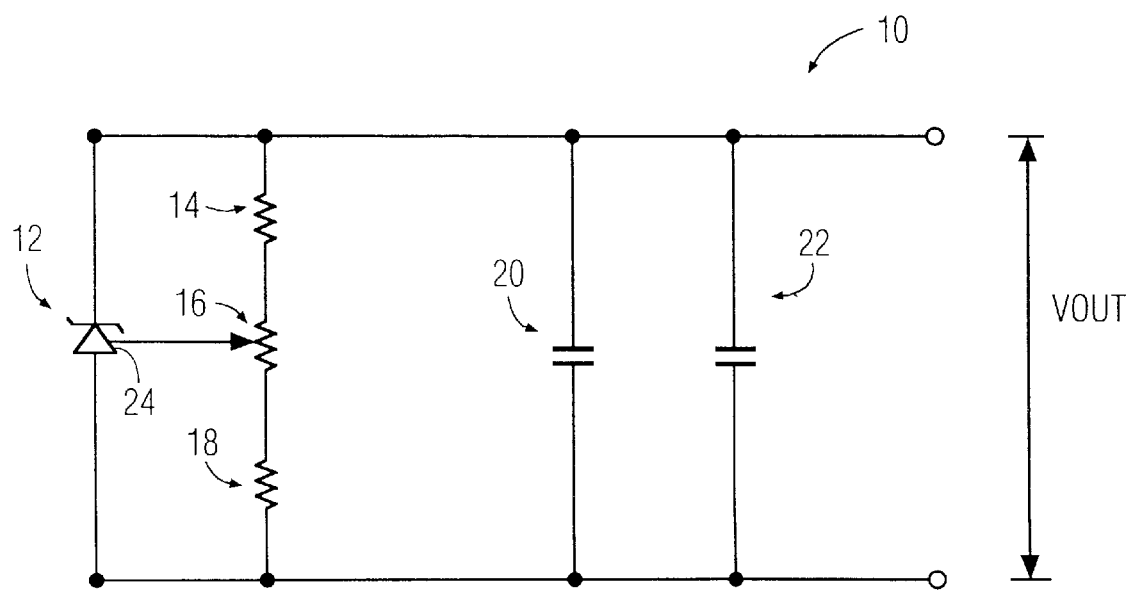
FIG. 2 is a schematic diagram of the temperature sensor described in FIG. 1 incorporated into initial electronic circuitry.

Referring to FIG. 2, a prior art circuit 10 is shown that incorporates a temperature sensor 12, such as the LM335. As shown, the sensor 12 is connected in parallel with a series connection of a first resistor 14, a potentiometer 16 and a second resistor 18 connected in series. Also connected in parallel separately with the sensor 12 are two capacitors 20, 22, for smoothing the voltage output of the circuit.

The sensor 12 has a bias input 24 that can be used to adjust the voltage output of the sensor 12. In the circuit of FIG. 2, the bias 24 is connected to the contact point of the potentiometer. Thus, the potentiometer is used to adjust the bias setting of the sensor 12.

In the "normal" bias 24 setting, i.e., where there is no bias, the contact point of the potentiometer 16 is at the midpoint of the resistance portion of the potentiometer 16, and the voltage at the bias 24 is zero. When the contact point of the potentiometer 16 moves away from the midpoint, the voltage at the bias 24 becomes positive or negative.

Figure 3:
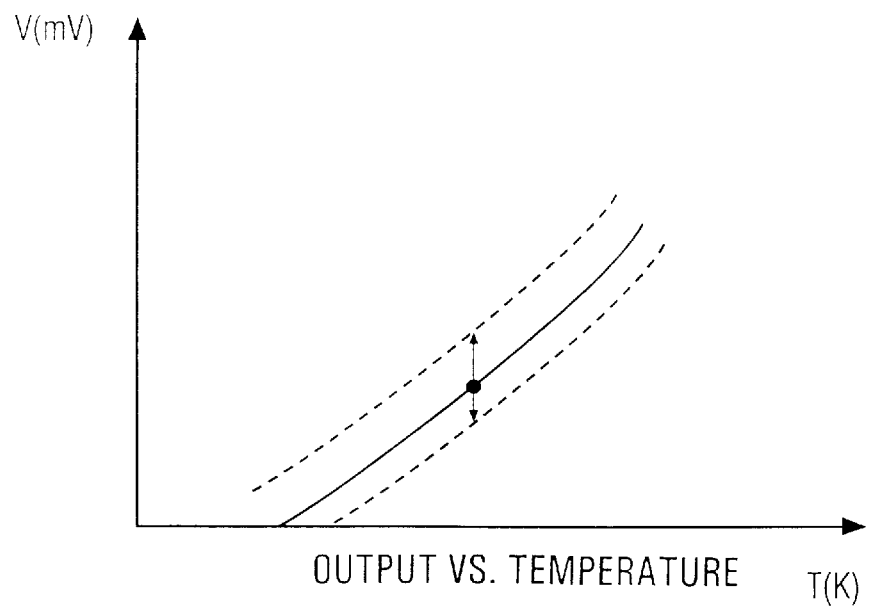
FIG. 3. is a graph of voltage output versus temperature for the circuit of FIG. 2 for a particular bias setting of the temperature sensor.

FIG. 3 shows the effect of a positive or negative voltage at the bias point on the graphic representation of FIG. 1: The voltage output of the sensor 12 increases or decreases with an increase or decrease in the bias voltage. Thus, the bias allows the output of the sensor 12 to be adjusted to a particular value for a particular temperature. However, as seen in FIG. 3, the bias only serves to shift the voltage versus temperature curve of the sensor by a constant amount along the vertical axis; it does not change the non-linearity of the output of the sensor. In other words, the bias only serves to add a constant (either zero, positive or negative) to the voltage output of the sensor over its operating range.

For the LM335, for every approximately 0.2952mV of voltage applied to the bias, there is an increase (or decrease, if the voltage applied at the bias is negative) of approximately 0.0 V at the output of the device.

Figure 4:
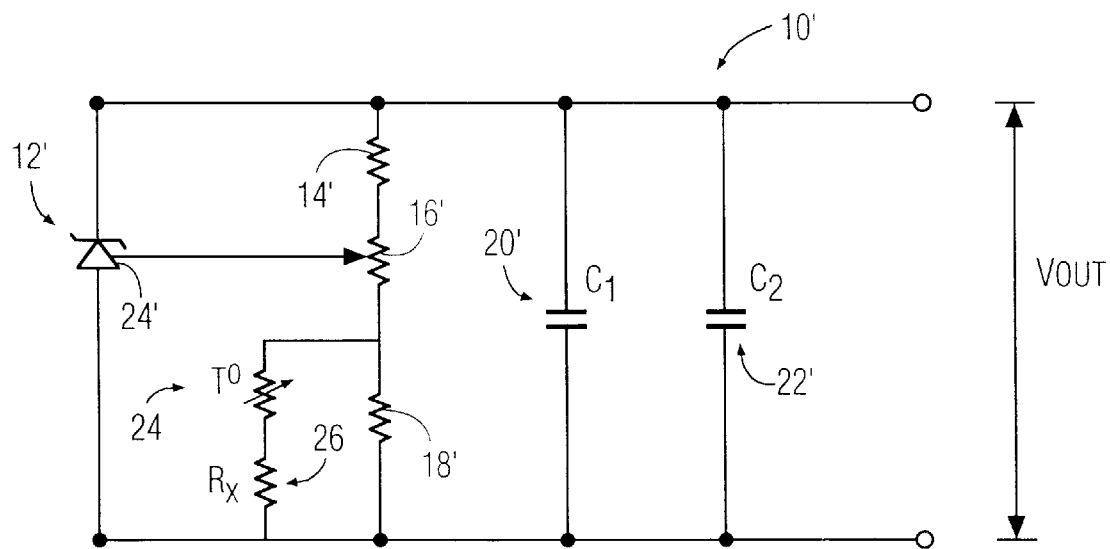
FIG. 4 is a schematic diagram of the present invention.

FIG. 4 depicts a circuit of the present invention, which can correct the non-linearity of the LM335 sensor over its operating temperature range. As seen in FIG. 4, many of the elements of the circuit and their configuration are the same as that shown in FIG. 3 and are thus analogously labeled with asterisked reference numerals. Setting the bias 24' of the sensor 12' by the resistors 14', 18' and potentiometer 16' is performed as described above with respect to FIG. 2. (The combination of resistors 18', 26 and thermistor 24 create one effective resistance below the potentiometer 16' that is, of course, different from the resistance of resistor 18'. Thus, the contact point of the potentiometer 16' for an equivalent setting of the bias 24' will be different from the circuit of FIG. 2.)

As seen in FIG. 4, the circuit 10' also includes an additional or secondary portion in the form of a series combination of a thermistor 24 and resistor 26, the combination connected in parallel with lower resistor 18'.

If thermistor 24 has a negative temperature coefficient (NTC), for example, its resistance decreases as the temperature increases and vice versa.

As the temperature of the thermistor 24 increases (with a corresponding decrease in it's resistance), the effective resistance of the combination of the thermistor 24 and resistors 18', 26 also decreases. It follows that the resistance below the contact point of the potentiometer 16' decreases, and there is an increase in the voltage drop across resistor 14' and the portion of the potentiometer 16' above the contact point as shown in FIG. 4. Consequently, the voltage at the contact point, and the bias 24' point, decreases.

The effect of the decrease in the voltage at the bias point 24' of the sensor 12' serves to reduce the voltage output of the sensor. If the sensor has a positive non-linearity, this reduction in the voltage output can serve to offset the non-linear increase in voltage output due to the positive drift of the sensor 12'.

Accordingly, for a sensor having PTC, with judicious matching between the NTC characteristics of the thermistor 24, the change in voltage output of the sensor as a function of bias, and the PTC characteristics of the sensor 12', the drift of the sensor 12' can be counteracted and a linear output can be created. The change in the bias voltage created by the thermistor 24 provides a correction for the non-linearity of the sensor 12' by decreasing the bias 24' voltage, thereby decreasing the voltage output of the sensor 12' with increasing temperature, thereby countervailing the positive temperature drift of the sensor 12'.

Figure 5:
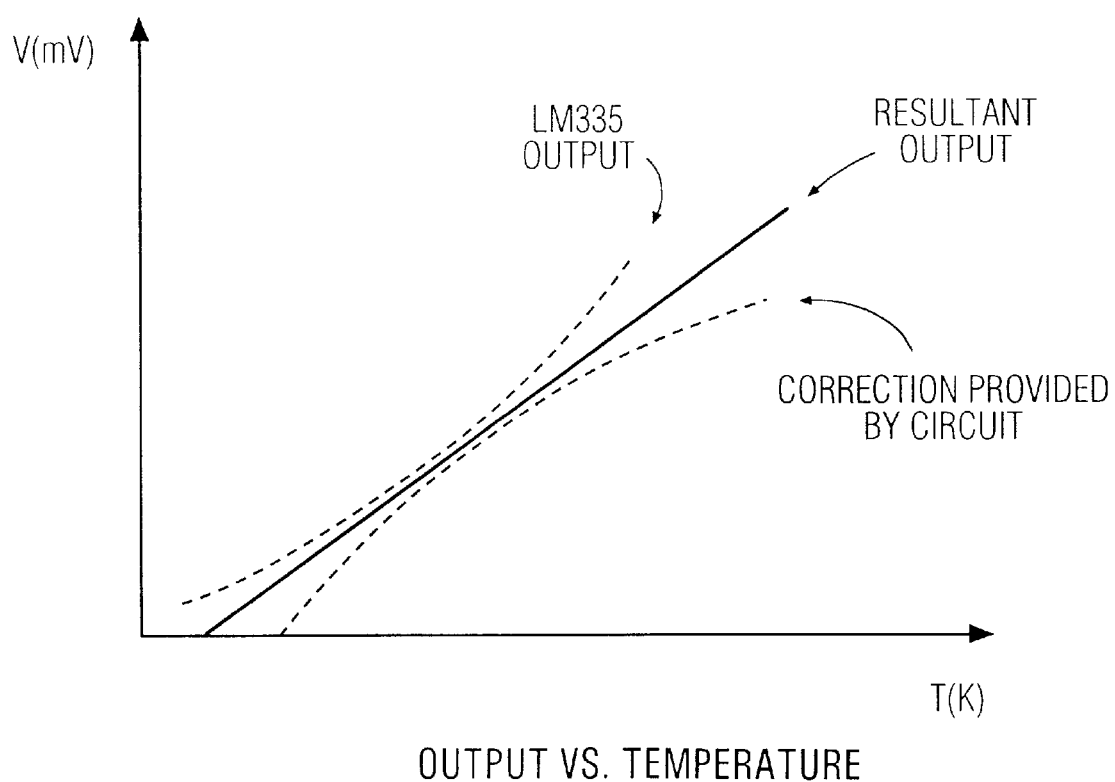
FIG. 5 is a graph of voltage output versus temperature for the circuit of FIG. 4.

This effect of so adjusting the bias voltage on the non-linearity of the sensor is graphically represented in FIG. 5. (Of course, a PTC thermistor can be matched with a sensor having NTC drift.)

Experimental Results

A circuit having the components and incorporating the LM335 sensor as shown in FIG. 4 was built and tested. In addition to the sensor 12' being the LM335, resistor 14' had a value of 2.7 KΩ, resistor 18' had a resistance of 2.7 Ω, potentiometer had a resistance of 1.0 KΩ, capacitor 20' had a capacitance of 0.01 µF, and capacitor 22' had a capacitance of 100 pF.

As noted above, in order to compensate for the positive drift of the LM335 over the operating range, the thermistor 24 must drift 180 degrees out of phase, or, equivalently, have an NTC. As also noted above, the non-linear drift of the LM335 is approximately 30 mV over its operating range. (This corresponds to a drift of approximately 3° C.) Finally, as also noted above, for every −0.2952 mV impressed at the bias point of the LM335, the voltage output will decrease by 0.01 V (10 mV).

Thus, in order to counterbalance the positive drift of 30 mV over the operating range of the LM335, the bias must be decreased by 3·(−0.2952 mV)=−0.8856 mV over the operating range. This will serve to reduce the output of the sensor by 30 mV, counteracting the 30 mV increase due to its positive drift.

In order to decrease the bias voltage by 0.8856 mV, the circuit is configured so that the voltage drop across resistor 18' is decreased by 0.8856 mV. In order to select particular values for the thermistor 24 and resistor 26 of the circuit, the nominal voltage across resistor 14', potentiometer 16' and resistor 18' is approximated to be 2.732V (which corresponds to the ideal voltage output of the LM335 at 0° C.). Since the net resistance across resistors 14', potentiometer 16' and resistor 18' is 6.4 KΩ, the nominal current through resistor 18' is approximated to be 2.732V/6.4 KΩ, or 0.4269 ma.

As determined above, the voltage across resistor 18' must decrease by 0.8856 mV over the operating range in order to sufficiently change the bias voltage. Thus, it is approximated that the effective resistance of the circuit below the potentiometer (as shown in FIG. 4) must change by −0.8856 mV/0.426875 ma, or a 2.074 Ω decrease in resistance.

Accordingly, the effective resistance provided by thermistor 24 and resistors 18', 26 must decrease by 2.074 Ω over the operating range of the LM335. Thus, resistor 26 was selected to have a value of 750 KΩ and a potentiometer 24 was chosen having a resistance of 20 KΩ at 25° C. and a negative temperature coefficient of 200 KΩ over 200° C. These components, in combination with the 2.7 KΩ resistance of resistor 18', created an approximately 2 Ω decrease in the bias voltage over the operating range of the sensor (approximately 140° C.). The non-linearity of output of the LM335 was reduced from 3° C. to approximately 0.5° C. over the operating range.

The above described structures and methodology are merely illustrative of the principles of the present invention. Numerous modifications and adaptations thereof will be readily apparent to those skilled in the art without departing from the spirit and scope of the present invention and the appended claims. For example, while the above experimental results give a particular circuit which will render the output of the sensor approximately linear over its operating range, there are other circuits that could be configured to interface with the bias of the sensor so that the output is approximately linear. In principle, many electrical circuits having a component with temperature coefficient that is opposite that of the sensor and which is configured to affect the sensor in a manner such that its output will be linear can be designed, and all would fall within the scope of the invention. Thus, the above description should be considered a representative embodiment of the invention and not a limitation on the scope of the invention.

What is claimed is:

1. A circuit for correcting a non-linear output of an electronic temperature sensor having a bias voltage input and a non-linear drift over an operating range of temperature, the circuit including:

a) a first circuit portion for adjusting a bias voltage of the sensor to a select initial voltage, b) a second circuit portion interfacing with the first circuit portion, the second circuit portion comprising at least one electronic element having a non-linear drift over the operating range of temperature in a direction opposite that of the drift of the temperature sensor, wherein the drift of the at least one electronic element alters the bias voltage over the operating range, the alteration of the bias voltage compensating at least in part for the non-linear drift of the temperature sensor.

2. A circuit as claimed in claim 1, wherein the at least one electronic element of the second circuit portion is a thermistor.

3. A circuit as claimed in claim 2, wherein the second circuit portion comprises a resistor and the thermistor connected in series.

4. A circuit as in claim 1, wherein the first circuit portion comprises at least one resistor connected in series with a potentiometer, the midpoint of the potentiometer connected to the bias input of the temperature sensor.

5. A circuit as claimed in claim 4, wherein the at least one electronic element of the second circuit portion is a thermistor.

6. A circuit as claimed in claim 5, wherein the thermistor of the second circuit portion is connected in parallel with the at least one resistor of the first circuit portion.

7. A circuit as claimed in claim 4, wherein the at least one resistor comprises a first resistor and a second resistor, the first resistor, the potentiometer and the second resistor being connected in series.

8. A circuit as claimed in claim 7, wherein the at least one electronic element of the second circuit portion is a thermistor.

9. A circuit as claimed in claim 8, wherein the thermistor of the second circuit portion is connected in parallel with one of the first and second resistor of the first circuit portion.

10. A circuit as claimed in claim 8, wherein the second circuit portion comprises a resistor and a thermistor connected in series, the second circuit portion connected in parallel with one of the first and second resistor of the first circuit portion.

11. A method for correcting a non-linear output of an electronic temperature sensor having a bias voltage input and a non-linear drift over an operating range, comprising:

a) adjusting a bias voltage of a first circuit potion of the sensor to select an initial voltage, b) altering the bias voltage of the first circuit portion over the operating range with a second circuit portion, the second circuit portion comprising at least one electronic element having a non-linear drift over the operating range of temperature in a direction opposite that of the drift of the temperature sensor, the alteration of the bias voltage compensating at least in part for the non-linear drift of the temperature sensor.

12. The method as claimed in claim 11, wherein the at least one electronic element is a thermistor.

13. The method as claimed in claim 11, wherein the at least one electronic element is an electronic circuit having a thermistor and a resistor.

* * * * *